July 1, 1930.  K. S. VALENTINE  1,768,870
MIXING AND SEPARATING OR CLASSIFYING APPARATUS
Filed April 4, 1929
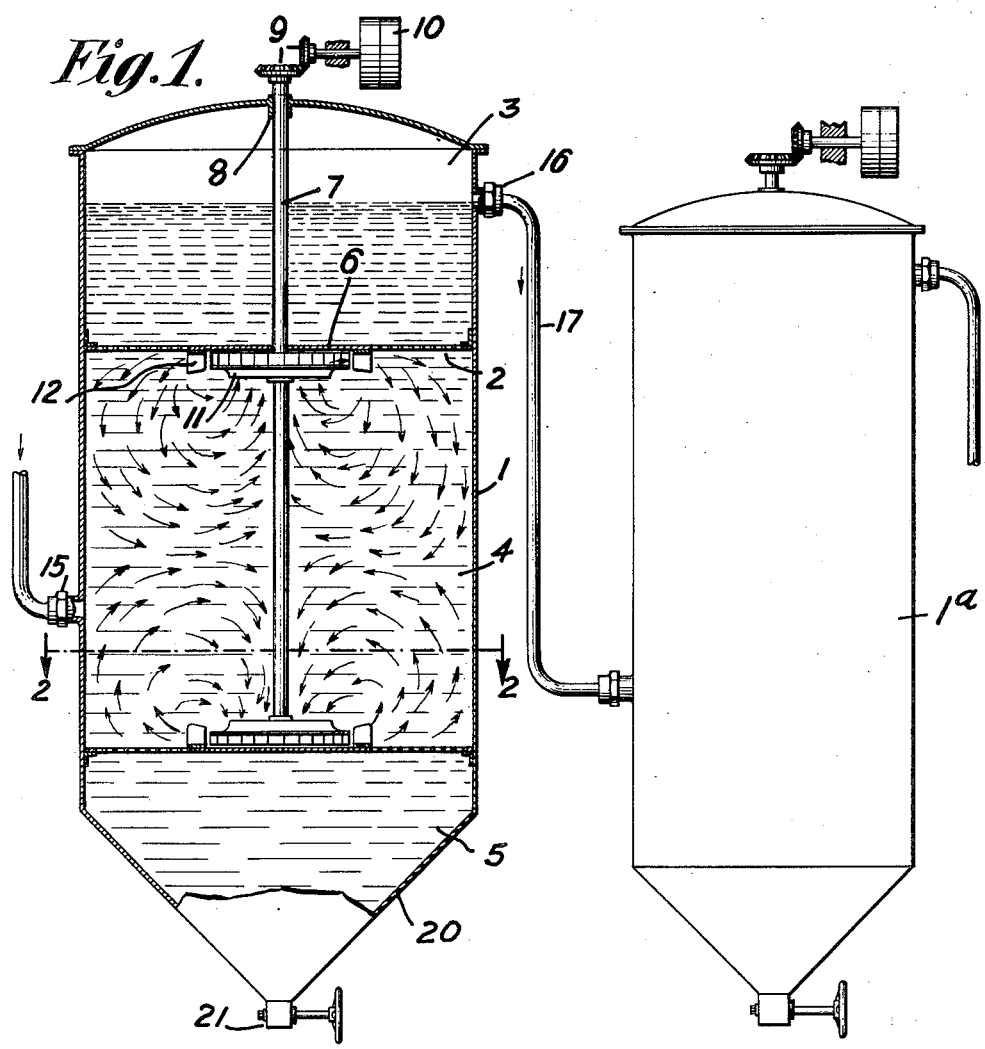
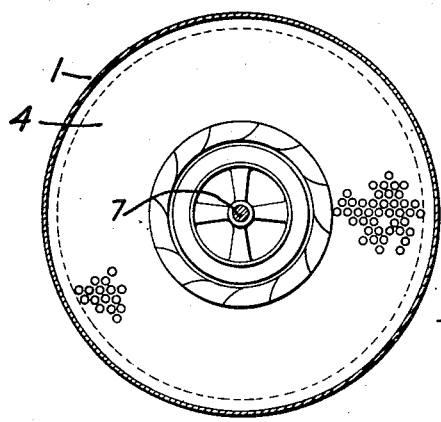

Patented July 1, 1930

1,768,870

UNITED STATES PATENT OFFICE

KENNETH S. VALENTINE, OF HOLLIS, NEW YORK, ASSIGNOR TO THE TURBO-MIXER CORPORATION, OF NEW YORK, N. Y., A CORPORATION OF NEW YORK

MIXING AND SEPARATING OR CLASSIFYING APPARATUS

Application filed April 4, 1929. Serial No. 352,360.

My invention relates to mixing and separating, or classifying, apparatus. Although it is capable of various uses, its nature and utility are sufficiently understood from its use in a process of oil refining in which oil is treated in a tank with acid, neutralizing material such as an alkali, or with wash water, and the apparatus serves to mix the oil and other material and also to classify the material and separate it in the respect that the treated oil, conditioned for discharge from the tank, is delievered to or accumulated in an upper part of the tank; sediment or waste material is accumulated in a lower part of the tank, and the central zone contains the material being actively mixed.

The apparatus is especially designed for continuous operation, in which fresh material is continuously supplied, and treated materials are continuously drained off from the apparatus, although it is also adapted or adaptable for "intermittent" operation, where desired.

For these purposes I provide one or a series of tanks, each of which is divided into central, upper and lower portions, by suitable grids or screens. Suitable mixing means or apparatus is located in the central or mixing zone or compartment; means is provided for taking off the treated material from the upper zone or compartment, and the lower zone or compartment is arranged as a sump from which the spent material may be discharged as desired.

The characteristics and advantages of the invention are further sufficiently explained in connection with the following detail description of the accompanying drawing, which shows one representative embodiment. After considering this example, skilled persons will understand that many variations may be made without departing from the principles disclosed, and I contemplate the employment of any structures that are properly within the scope of the appended claims.

Fig. 1 is an elevation of apparatus embodying the invention in one form, one of the tanks being shown in section.

Fig. 2 is a section at 2—2, Fig. 1.

The tank 1 is usually in the form of an upright cylinder. Upper and lower screens or grids 2 divide the tank into an upper compartment or chamber 3, a central chamber 4, and a lower chamber or sump 5. Outer portions of the screens are perforated or apertured in suitable sizes for the work in view, but preferably the central portions 6, corresponding in area to the mixing units, are imperforate. A vertical shaft 7 is mounted in suitable bearings such as 8 and is driven in any desired way, as by gears 9 and pulleys 10 from a countershaft, or otherwise. On the shaft near each screen and at the inner side thereof is a mixer, preferably of the turbo type, including a rotary impeller 11 and a stationary annular deflector 12, these being of known type and designed to produce in the central or mixing compartment 4 a circulation substantially as indicated by arrows, that is from the vicinity of the shaft in either direction inward and upward or downward to the central aperture of the impeller, then out through the impeller to the deflector, and then out and downward along the tank wall and so back toward the shaft.

A supply pipe and connection is provided as at 15 leading into the mixing compartment at a suitable point, for continuous or intermittent supply of materials to be mixed, such as oil and acid, oil and alkali, oil and wash water, or other materials. A discharge connection 16 is provided at a desired level in the wall of the upper chamber 3 with a discharge pipe 17 leading to any desired point, such as the mixing chamber of a second tank 1ª of similar character to the first, when the tanks and mixing apparatus are arranged in series.

The sump usually has a sloping or conical bottom 20 and any suitable discharge valve or tap 21.

In operation, vigorous and effective mixing is performed in the central compartment in the manner above explained. Treated oil or other material rises through the upper grid, and is intermittently or continuously drawn off at the desired level through the outlet fitting and pipe 17. The heavier, spent material passes through the lower screen and accumulates in the sump, from which it is discharged, intermittently or continuously, as desired, by control of the valve 21.

I claim:

1. Mixing and separating or classifying apparatus comprising a tank, screens dividing the tank into upper, central and lower chambers, and mixing apparatus in the central chamber.

2. Mixing and separating or classifying apparatus comprising a tank, screens dividing the tank into upper, central and lower chambers, a rotary mixer in the central chamber, and a shaft passing into the tank and connected to the mixer.

3. Mixing and separating or classifying apparatus comprising a tank, screens dividing the tank into upper, central and lower chambers, a rotary turbo mixer in the central chamber adjacent one of the screens, and a shaft passing into the tank for operating the mixer.

4. Mixing and separating or classifying apparatus comprising a tank, screens dividing the tank into upper, central and lower chambers, rotary turbo mixers adjacent inward faces of the upper and lower screens in the central chamber, and a shaft passing into the tank and connected to the rotors of the mixers.

5. Mixing and separating or classifying apparatus comprising a tank, screens dividing the tank into upper, central and lower chambers, and mixing apparatus in the central chamber, the screens having central imperforate portions corresponding substantially to the area of the mixing apparatus.

6. Mixing and separating or classifying apparatus comprising a tank, screens dividing the tank into upper, central and lower chambers, mixing apparatus in the central chamber, means for supplying material to the central chamber, and means for discharging treated material from the upper chamber.

7. Mixing and classifying apparatus comprising a vertical, cylindrical tank, screens therein dividing it into upper, central and lower chambers, mixing apparatus in the central chamber, and a vertical shaft for driving the mixing apparatus.

8. Mixing and classifying apparatus comprising a vertical, cylindrical tank, screens therein dividing it into upper, central and lower chambers, mixing apparatus in the central chamber, and a vertical shaft for driving the mixing apparatus, the lower chamber being arranged as a sump and provided with a discharge valve.

9. Mixing and classifying apparatus comprising a vertical, cylindrical tank, screens therein dividing it into upper, central and lower chambers, mixing apparatus in the central chamber, a vertical shaft for driving the mixing apparatus, means for supplying material to the central chamber, and means for drawing off treated material from a suitable level in the upper chamber.

10. Mixing and classifying apparatus comprising a vertical cylindrical tank, screens therein dividing it into upper, central and lower chambers, mixing apparatus in the central chamber, a vertical shaft for driving the mixing apparatus, means for supplying material to the central chamber, and means for drawing off treated material from a suitable level in the upper chamber, the lower chamber being arranged as a sump and provided with a discharge valve.

11. Mixing and classifying apparatus comprising a tank, means therein for centrally mixing materials, accumulating treated material in the upper portion of the tank, and accumulating spent material in the lower portion thereof, means for supplying material for treatment to the central mixing zone, means for drawing off treated material from the upper portion of the tank, and means for discharging spent material from the lower portion of the tank.

12. Mixing and classifying apparatus comprising a tank, means therein including screens and a rotary mixer therebetween for centrally mixing materials, accumulating treated material in the upper portion of the tank, and accumulating spent material in the lower portion thereof, means for supplying material to be treated to the central zone between the screens, means for drawing off treated material from the upper portion of the tank, and means for discharging spent material from the lower portion of the tank.

13. Mixing and classifying apparatus comprising a tank, spaced screens extending across the tank and dividing it definitely into a central mixing chamber, an upper chamber for treated material and a lower chamber for spent material, mixing and circulating apparatus in the central chamber between the screens constructed and arranged to produce continuous circuitous flow of the material in the mixing chamber without general circulation to or from the upper and lower chambers, the screens constituting perforate partitions through which treated material rises to the upper chamber and spent material passes to the lower chamber.

14. The structure defined in claim 13, with the addition of means for supplying material to the central chamber between the screens, means for discharging treated material from the upper chamber, and means for discharging spent material from the lower chamber.

In testimony whereof I affix my signature.

KENNETH S. VALENTINE.